(12) United States Patent
Küllmer

(10) Patent No.: US 11,981,284 B2
(45) Date of Patent: May 14, 2024

(54) DEPLOYABLE FLAP HINGE

(71) Applicant: Edscha Engineering GmbH, Remscheid (DE)

(72) Inventor: Fabian Küllmer, Remscheid (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 89 days.

(21) Appl. No.: 17/603,197

(22) PCT Filed: Apr. 7, 2020

(86) PCT No.: PCT/DE2020/100285
§ 371 (c)(1),
(2) Date: Oct. 12, 2021

(87) PCT Pub. No.: WO2020/211902
PCT Pub. Date: Oct. 22, 2020

(65) Prior Publication Data
US 2022/0185227 A1    Jun. 16, 2022

(30) Foreign Application Priority Data

Apr. 17, 2019    (DE) ...................... 20 2019 102 218.3

(51) Int. Cl.
*B60R 21/38* (2011.01)
(52) U.S. Cl.
CPC .................................. *B60R 21/38* (2013.01)
(58) Field of Classification Search
CPC ..................................................... B60R 21/38
See application file for complete search history.

(56) References Cited

U.S. PATENT DOCUMENTS

2006/0213709 A1* 9/2006 Yamaguchi ............. F15B 15/19
296/193.11
2013/0074284 A1* 3/2013 Kuhr ....................... B60R 21/38
16/222

(Continued)

FOREIGN PATENT DOCUMENTS

CN    102444348 B  * 11/2014  ............. B60R 21/38
CN    106703578 A  *  5/2017  ............. B60R 21/38

(Continued)

OTHER PUBLICATIONS

KR 101463345 B1 including FIT database translation (Year: 2014).*

(Continued)

*Primary Examiner* — Barry Gooden, Jr.
(74) *Attorney, Agent, or Firm* — Davidson, Davidson & Kappel, LLC

(57) ABSTRACT

A deployable flap hinge includes a flap part (2) corresponding to a flap (A). The flap part (2) has a flap upper part (4) and a flap lower part (5), a body part (3) corresponding to a vehicle body (B), a first joint assembly (6) connecting the flap part (2) and the body part (3) in an articulated manner, and a second joint assembly (7) connecting the flap upper part (4) and the flap lower part (5) to one another in an articulated manner. The flap upper part (4) can be swivelled relative to the flap lower part (5) between a resting position and a deployed position. The deployable flap hinge also includes a locking assembly (40) for locking the deploying movement of the flap upper part (4), and a pretensioning device (10) for pretensioning the flap upper part (4) in the direction of the deployed position. The pretensioning device (10) includes a pretensioning element (11) formed as a single piece from a part of the flap hinge (1).

13 Claims, 2 Drawing Sheets

(56) References Cited

U.S. PATENT DOCUMENTS

| | | | | |
|---|---|---|---|---|
| 2013/0227818 A1* | 9/2013 | Zippert | ............... | B60R 21/38 16/366 |
| 2014/0182962 A1* | 7/2014 | McIntyre, I | ............ | B60R 21/38 180/274 |
| 2015/0232058 A1* | 8/2015 | Fermer | ............... | E05D 3/125 180/271 |
| 2016/0245003 A1* | 8/2016 | McIntyre | ............... | B60R 21/38 |
| 2017/0282847 A1 | 10/2017 | Jenny | | |
| 2017/0369028 A1* | 12/2017 | Patterson | ............... | B60R 21/38 |
| 2018/0371804 A1* | 12/2018 | Inan | ............... | E05B 77/08 |
| 2019/0061679 A1 | 2/2019 | Gabler | | |
| 2019/0168705 A1* | 6/2019 | Springsklee | ............ | E05D 3/147 |

FOREIGN PATENT DOCUMENTS

| | | | | |
|---|---|---|---|---|
| CN | 107916855 A | 4/2018 | | |
| CN | 108698557 A | 10/2018 | | |
| DE | 102010023975 | 1/2011 | | |
| DE | 102010012511 A1 * | 9/2011 | ............ | B60R 21/38 |
| DE | 102014212223 A1 | 12/2015 | | |
| DE | 102015223286 A1 * | 6/2016 | ............ | B60R 21/34 |
| EP | 1880907 | 1/2008 | | |
| EP | 2277746 A1 | 1/2011 | | |
| EP | 2345563 A1 * | 7/2011 | ............ | B60R 21/38 |
| EP | 2345563 A1 | 7/2011 | | |
| EP | 2380787 A1 | 10/2011 | | |
| EP | 2733025 A1 | 5/2014 | | |
| EP | 4177117 A1 * | 5/2023 | | |
| KR | 101463345 B1 * | 11/2014 | ............ | B60R 21/38 |
| WO | WO-2015047425 A1 * | 4/2015 | ............ | B60R 21/38 |
| WO | WO2017206987 A1 | 12/2017 | | |
| WO | WO-2023039259 A1 * | 3/2023 | | |

OTHER PUBLICATIONS

Corresponding PCT International Search Report of PCT/DE2020/100285.

Corresponding PCT Written Opinion of the International Searching Authority (and English translation thereof).

\* cited by examiner

DEPLOYABLE FLAP HINGE

The present disclosure relates to a lockably deployable flap hinge which is suitable for use in a pedestrian protection system.

BACKGROUND

Various flap hinges are known from practice which are intended to move a front flap coupled to the flap hinge into a deployed position in the event of a detected pedestrian impact, for example by means of a spring assembly, by means of a pyrotechnic trigger arrangement, or the like, such that the front flap held in a deployed position, at a distance from the components of the engine compartment that present a danger, undergoes a deformation that slows the impact.

Such flap hinges have a flap part and a body part which are connected to each other in an articulated manner via a joint assembly. In some embodiments, the flap part is composed of an upper flap part and a lower flap part, which are also connected to each other in an articulated manner via a further joint assembly and can thereby be pivoted relative to each other in the manner of scissors. In particular when the flap hinge is used for pedestrian protection, a preload force is required between the individual hinge components in order to compensate for tolerances or also to prevent disturbing noise from parts hitting against each other. For example, such noise can arise from the fact that connection points between the hinge parts cannot always be made exactly congruent, such that there is always a certain play between the parts.

EP 2 277 746 A1 discloses a deployable flap hinge having a flap part assigned to a flap and having a body part assigned to a vehicle body. The flap part comprises an upper flap part, which can be connected directly to the flap, and a lower flap part. The flap part and the body part are connected to each other in an articulated manner via a first joint assembly designed as a four-bar linkage. The upper flap part is connected in an articulated manner to the lower flap part via a second joint assembly designed as a single joint. Due to the second joint assembly, the upper flap part and the lower flap part can be pivoted relative to each other between an idle position and a deployed position, which corresponds to the protective position of the flap in the event of an impact. In addition, the known flap hinge comprises a locking arrangement formed by a locking bolt and perforations provided in the upper flap part or lower flap part, for locking the deployment movement of the upper flap part relative to the lower flap part. In addition to the locking bolt, the locking arrangement comprises a detent element designed as a leaf spring, which ensures that the flap part is locked after the flap has been manually reset from the deployed position to the idle position. Finally, the deployable flap hinge comprises a preload means designed as an actuator for preloading the upper flap part in the direction towards the deployed position in the event of an impact. The disadvantage of the disclosed flap hinge is that no preload force is provided in the idle position, such that tolerances are not sufficiently compensated for, and this can cause disruptive noises due to the relative movement of the upper flap part and the lower flap part.

DE 10 2010 023 975 discloses a deployable flap hinge having a flap part assigned to a flap and a body part assigned to a vehicle body. The flap part and the body part are connected to each other in an articulated manner via a first joint assembly designed as a four-bar linkage. The flap part comprises an upper flap part which can be connected directly to the flap, and a lower flap part, the upper flap part and the lower flap part being connected to each other via a second joint assembly. The second joint assembly allows the upper flap part to be pivoted from an idle position into a deployed position with respect to the lower flap part. The known flap hinge further comprises a locking arrangement for locking a deployment movement of the upper flap part, the locking arrangement comprising a shear bolt and a shear plate.

EP 2 733 025 A1 discloses a deployable flap hinge comprising a flap part assigned to a flap and a body part assigned to a vehicle body, the flap part having an upper flap part that can be directly connected to the flap and a lower flap part pivotably connected to the upper flap part via a joint assembly. The upper flap part can be pivoted between an idle position and a deployed position by means of a drive device. The known flap hinge further comprises a locking arrangement for locking the deployment movement of the upper flap part with respect to the lower flap part.

SUMMARY

It is an object of the present disclosure to provide a deployable flap hinge that provides a preload force between hinge components in a cost-effective and space-saving manner.

The present disclosure provides a deployable flap hinge comprising a flap part assigned to a flap, the flap part comprising an upper flap part and a lower flap part. The deployable flap hinge also comprises a body part assigned to a vehicle body, a first joint assembly which connects the flap part to the body part in an articulated manner, a second joint assembly which connects the upper flap part to the lower flap part in an articulated manner, the upper flap part being pivotable relative to the lower flap part between an idle position and a deployed position. The deployable flap hinge further comprises a locking arrangement for locking the deployment movement of the upper flap part and a preloading device for preloading the upper flap part in the direction towards the deployed position. The deployable flap hinge is characterized in that the preloading device comprises a preload element formed in a single piece from a part of the flap hinge. A flap hinge is advantageously created in this way which provides a cost-effective and space-saving way for preloading hinge parts as required in the field of pedestrian protection. In particular no further components are required which have to be additionally manufactured or attached to the flap hinge, since the preload means can be produced by appropriate adaptation of the manufacturing process of the specific part of the flap hinge on which the preload element is formed.

The preload element is particularly preferably designed as a metal strip, at least in sections. Advantageously, by designing the geometry, a flexible adjustment of the preload force of the preload element can be realized in a simple manner by appropriate bending. In a particularly advantageous embodiment, the preload element is made of steel. Steel is characterized by high strength, good hardenability, rigidity and elongation at break, can be deformed both warm and cold, and is available in large quantities and in good quality. In this way, a reliable preload of hinge components can advantageously be provided in a particularly cost-effective and simple manner.

In a particularly preferred embodiment, it is provided that the preload element is formed from a portion of the flap part. In particular it is advantageously ensured that the preload element can be designed in a very space-saving manner, since it can be molded near the upper flap part, and no unnecessary distances have to be bridged. Accordingly, the preload element can thereby be made compact, and can be flexibly adapted independently of the geometric configuration of the body part or other parts of the flap hinge. The preload element is particularly preferably formed from a portion of the lower flap part. Alternatively the preload element is formed from a portion of the upper flap part.

The preload element expediently has a fixed support portion for supporting the preload element on the flap hinge. The support portion serves to ensure a preload force that is as constant as possible between the hinge parts and, at the same time, serves to ensure that no deformations occur in the portions adjoining the preload element. The support portion absorbs all of the preload forces generated by the preload element, and other forces acting on the upper flap part, and directs them to the part of the flap hinge formed in a single piece with the preload element. Thus a reliable and permanent preload is advantageously ensured.

In an expedient embodiment, the preload element has a spring portion for preloading the upper flap part in the direction towards the deployed position.

Particularly preferably, the spring portion adjoins the support portion, such that a reliable adjustment of the preload force is made possible in a defined manner by adapting the spring portion.

The spring portion particularly preferably has a contour that is bent in the direction towards the upper flap part. This ensures that a spring force on the upper flap part can be generated by the spring portion engaging the upper flap part, and the internal tension of the preload element generating a corresponding preload force on the upper flap part.

The spring portion expediently is less thick in cross section than the support portion. This advantageously ensures that the spring portion is sufficiently elastic to provide a constant preload force, and the support portion is designed to be more rigid relative to it and accordingly only influences the preload force through its position, but not through its own elasticity relative to the upper flap part.

Further advantages, features and properties of the present disclosure will become apparent from the following description of a preferred embodiment.

BRIEF SUMMARY OF THE DRAWINGS

The present disclosure will now be explained in more detail with reference to the accompanying drawings and a preferred embodiment of the present disclosure.

DETAILED DESCRIPTION

Figure 1:
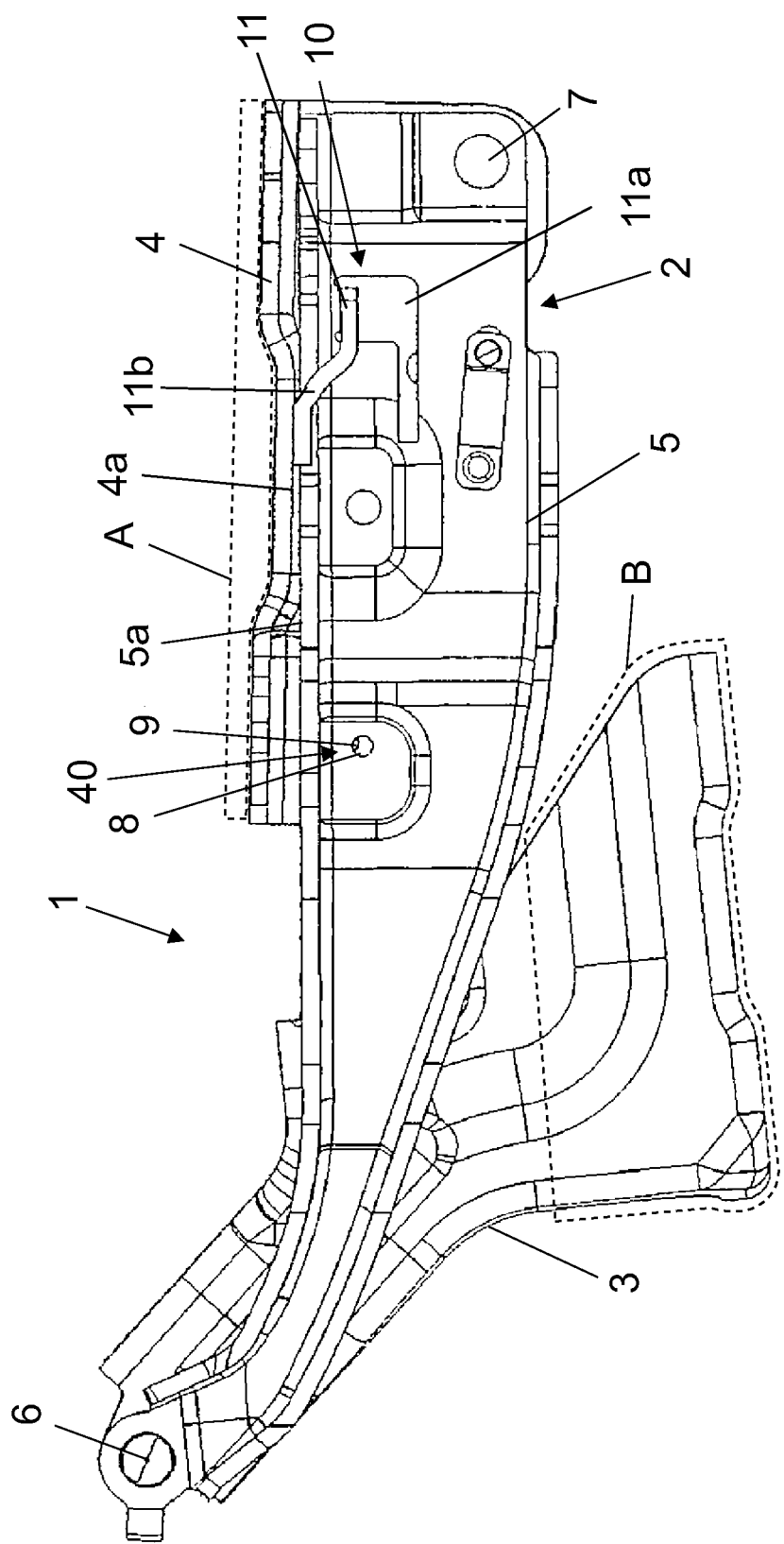
FIG. 1 shows a preferred embodiment of a deployable flap hinge, in a side view in a partially deployed state.

FIG. 1 shows a preferred embodiment of a flap hinge 1 according to the present disclosure, in a side view in a partially deployed state. The flap hinge 1 comprises a flap part 2 assigned to a flap A and a body part 3 assigned to the vehicle body, the flap part 2 consisting of an upper flap part 4, to which the flap A is connected, and a lower flap part 5. The flap part 2 can be pivoted with respect to the body part 3 via a first joint assembly 6 designed as a single joint, in order to pivot the flap A between a closed position and an open position.

The upper flap part 4 and the lower flap part 5 are pivotably connected to each other via a second joint assembly 7 designed as a single joint, such that the upper flap part 4 and the lower flap part 5 can be pivoted with respect to each other in a scissor-like manner. This scissor-like coupling makes it possible in particular, for the end of the flap A remote from the flap lock to be raised or opened in a known manner with respect to the engine block.

The lower flap part 5 has, in a central portion, a bore 8 in a side wall, which can be brought into engagement with a rivet bolt 9 which is fixed to the upper flap part 4 and which is partially covered here, such that a corresponding stop and/or a lock is created, in particular towards a deployed position of the upper flap part 4 and the lower flap part 5, in which deployed position they form an angle with each other. The bore 8 and the rivet bolt 9 thus jointly form a locking arrangement 40 for locking a deployment movement of the upper flap part 4.

The rivet bolt 9 is sheared off when a pedestrian protection function is triggered, because a force is generated between the upper flap part 4 and the lower flap part 5 via a triggering arrangement in order to move the upper flap part 4 relative to the lower flap part 5 into a deployed position.

In the vicinity of the single joint 7 about which the upper flap part 4 can be pivoted relative to the lower flap part 5, a preloading device 10 is arranged on the side wall of the lower flap part 5. The preloading device 10 comprises a preload element 11 which is designed in sections as a metal strip, which is formed in a single piece from the lower flap part 5, and which is made of steel. The preload element 11 has an L-shaped support portion 11a which adjoins the side wall of the lower flap part 5.

Projecting laterally from the support portion 11a, the preload element 11 comprises a spring portion 11b which is designed as a spring tongue. The cross section of the spring portion 11b has a significantly lower thickness than the adjoining L-shaped support portion 11a and is accordingly flexible and suitable for generating a constant spring force between the flap upper flap part 4 and the lower flap part 5.

An end of the spring portion 11b spaced apart from the support portion 11a rests against a lower edge 4a of the upper flap part 4, such that the spring portion 11b can exert a preload force on the upper flap part 4 upwards in the direction towards a deployed position. In the state of the flap hinge 1 shown here, the upper flap part 4 rests loosely on the spring portion 11b.

Figure 2:
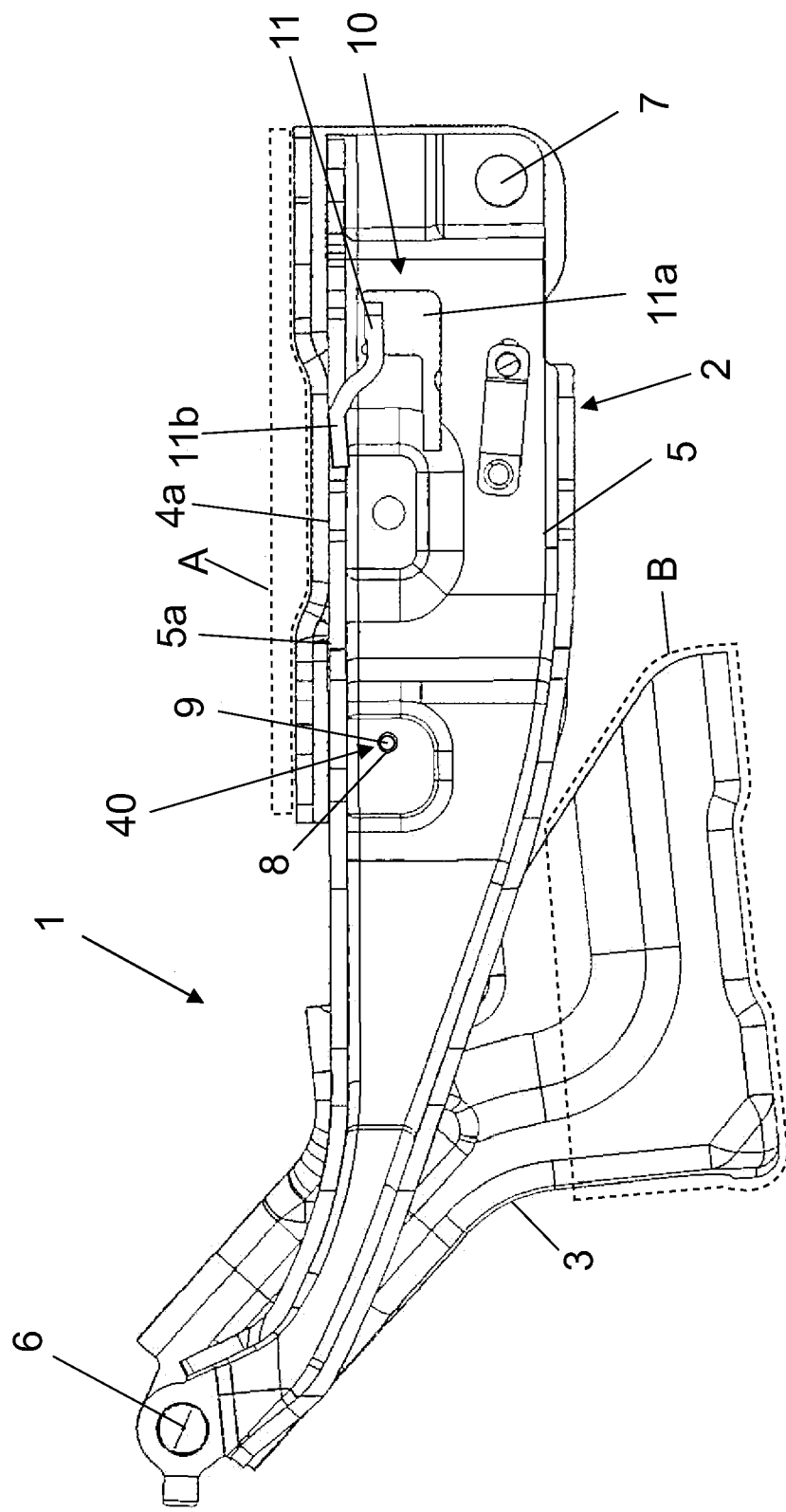
FIG. 2 shows the embodiment of a deployable flap hinge shown in FIG. 1, in a side view in a locked state.

FIG. 2 shows the embodiment of a deployable flap hinge shown in FIG. 1, in a locked state. The upper flap part 4 has been pivoted around the single joint 7 into an idle position in which the lower edge 4a of the upper flap part 4 and an upper edge 5a of the lower flap part 5 run parallel to each other. This state corresponds to the situation in which the flap A connected to the flap hinge 1 or the upper flap part 4 can be displaced between an open and closed position during normal operation by pivoting about the single joint 6. In this state, the rivet bolt 9 penetrates the bore 8 in the side wall of the lower flap part 5, thereby locking a pivot of the upper flap part 4 relative to the upper flap part 5.

As can be seen in FIG. 2, the spring portion 11b has been bent downwards by the displacement of the upper flap part 4 into the idle position, by the lower edge 4a, such that, due to the inherent tension of the spring portion 11b, a preload force is exerted by the preload element 11 on the upper flap part 4 in the direction towards the deployed position, in which the upper flap part 4 and the lower flap part 5 form an angle with each other.

Advantageously, as a result, the rivet bolts 9 are not subjected to variable loading or force peaks which, without a corresponding preload by means of the preload element 11, are exerted by external forces on the flap A during driving and can thus also induce a sometimes jerky movement of the upper flap part 4. Such variable loading leads accordingly to a disruptive operating noise since the rivet bolt 9 in the bore 8 strikes the inner edge of the bore 8. In extreme cases, fatigue fracture of the rivet bolt 9 is also possible in the long run, which leads to an unwanted unlocking of the deployable flap hinge.

Due to the preload provided by the preload element 11 between the upper flap part 4 and the lower flap part 5, there is advantageously a pulsating loading in the region of the rivet bolt 9, which ensures that the rivet bolt 9 does not strike the bore 8 during normal operation of the vehicle, such that both a reduction in operating noise and a minimization of the risk of fatigue fracture of the rivet bolt 9 are achieved.

The present disclosure was explained above using an embodiment in which the preload means 11 is designed as a spring tongue or metal strip formed from the material of the lower flap part 5. It is understood that the preload element 11 can also be formed from the material of the upper flap part 4, wherein the preload means 11 can be molded onto the lower edge 4a of the upper flap part 4, for example. Furthermore, the lower edge 4a could be perforated at one point, the upper edge 4a opposite this point having a strip-shaped section which is bent in the direction towards the upper edge 5a of the lower flap part 5 and thus causes a preload force on the upper flap part 4 in the direction towards the deployed position.

The present disclosure has been explained above using an embodiment in which the preload means comprises a spring portion 11b and an additionally shaped support portion 11a. It is understood that the spring portion 11b can be removed laterally from the side wall of the lower flap part 5 without additional support in the vertical direction. This can be achieved by the cross section of the spring portion 11b being made somewhat thicker, at least in sections, thus simultaneously providing a preload force and at the same time being dimensionally stable to such a degree that the preload force remains largely constant over the long term.

The present disclosure has been explained above using an embodiment in which the spring portion 11b of the preload element 11 has an S-shaped cross section. It is understood that the spring portion 11b can have any shape in cross section, provided that it provides a preload force on the upper flap part in order to preload it in the direction towards the deployed position. For example, the spring portion 11b could be L-shaped, the short leg being in contact with the lower edge 4a of the lower flap part 4.

What is claimed is:

1. A deployable flap hinge, comprising:
    a flap part assigned to a flap, the flap part comprising an upper flap part and a lower flap part;
    a body part assigned to a vehicle body;
    a first joint assembly connecting the flap part and the body part in an articulated manner;
    a second joint assembly connecting the upper flap part and the lower flap part in an articulated manner, the upper flap part being pivotable relative to the lower flap part between an idle position and a deployed position;
    a locking arrangement for locking a deployment movement of the upper flap part; and
    a preload device for preloading the upper flap part in a direction towards the deployed position in a locked state of the upper flap part, the preload device including a preload element formed in a single piece from a part of the flap hinge,
    wherein the preload element has a fixed support portion for supporting the preload element on the flap hinge, wherein the support portion is arranged spaced below an upper edge of the lower flap part on the side wall of the lower flap part.

2. The deployable flap hinge according to claim 1, wherein the preload element is a metal strip.

3. The deployable flap hinge according to claim 1, wherein the preload element is made of steel.

4. The deployable flap hinge according to claim 1, wherein the preload element is formed from a portion of the flap part.

5. The deployable flap hinge according to claim 1, wherein the preload element is formed from a portion of the lower flap part.

6. The deployable flap hinge according to claim 1, wherein the preload element is formed from a portion of the upper flap part.

7. The deployable flap hinge according to claim 1, wherein the preload element has a fixed support portion for supporting the preload element on the flap hinge.

8. The deployable flap hinge according to claim 7, wherein the preload element has a spring portion for preloading the upper flap part of the flap in the direction towards the deployed position.

9. The deployable flap hinge according to claim 8, wherein the spring portion has a contour bent in a direction towards a top part of the flap.

10. The deployable flap hinge according to claim 9, wherein the spring portion is less thick in cross section than the fixed support portion.

11. The deployable flap hinge according to claim 8, wherein the spring portion is projecting laterally from the support portion, wherein the support portion is arranged between the spring portion and the side wall of the lower flap part.

12. The deployable flap hinge according to claim 11, wherein an upper end of the spring portion has a flat upper surface resting against a lower edge of the upper flap part.

13. The deployable flap hinge according to claim 12, wherein the upper end of the spring portion is connected to a lower end of the spring portion by a middle section, wherein the middle section forms an angle with the lower and upper end of the spring portion.

* * * * *